(12) United States Patent
Oguro et al.

(10) Patent No.: US 10,810,878 B2
(45) Date of Patent: Oct. 20, 2020

(54) VEHICLE CONTROL SYSTEM, VEHICLE CONTROL METHOD, AND VEHICLE CONTROL PROGRAM

(71) Applicant: HONDA MOTOR CO., LTD., Minato-ku, Tokyo (JP)

(72) Inventors: Hiroshi Oguro, Wako (JP); Katsuya Yashiro, Wako (JP); Toshiyuki Kaji, Wako (JP); Toru Kokaki, Wako (JP); Masanori Takeda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/470,574

(22) PCT Filed: Dec. 28, 2016

(86) PCT No.: PCT/JP2016/089099
§ 371 (c)(1),
(2) Date: Jun. 18, 2019

(87) PCT Pub. No.: WO2018/123019
PCT Pub. Date: Jul. 5, 2018

(65) Prior Publication Data
US 2020/0082724 A1  Mar. 12, 2020

(51) Int. Cl.
*B60Q 1/00* (2006.01)
*G08G 1/16* (2006.01)
(Continued)

(52) U.S. Cl.
CPC ............ *G08G 1/166* (2013.01); *B60R 21/00* (2013.01); *B60T 8/17* (2013.01); *B60W 30/10* (2013.01);
(Continued)

(58) Field of Classification Search
CPC ........ G08G 1/166; G08G 1/161; G08G 1/164; B60R 21/00; B60T 8/17; B60W 30/10; G01S 13/931; G06K 9/00798
See application file for complete search history.

(56) References Cited

U.S. PATENT DOCUMENTS

2013/0190985 A1* 7/2013 Nakano ................ B62D 15/025
   701/41
2014/0372561 A1  12/2014 Hisano
(Continued)

FOREIGN PATENT DOCUMENTS

| JP | 2013-232079 | 11/2013 |
| WO | 2014-041826 | 3/2014 |
| WO | 2016-194960 | 12/2016 |

OTHER PUBLICATIONS

International Search Report and Written Opinion for International Application No. PCT/JP2016/089099 dated Mar. 21, 2017, 9 pgs.

*Primary Examiner* — Phung Nguyen
(74) *Attorney, Agent, or Firm* — Amin, Turocy & Watson, LLP

(57) ABSTRACT

A vehicle control system includes a lane line recognizer that recognizes lane lines of a road on which a vehicle is traveling, a virtual line setter that sets, when there is a section in which the lane lines are not recognizable by the lane line recognizer after passing through a gate installed on the road, a virtual line with a terminating end portion of a lane line extending from the gate or an object present near the gate as one end and a beginning end portion of the lane line in a future travel area of the vehicle which is present ahead of the section in which the lane lines are not recognizable as another end, and an automated driving controller that performs automated driving in the section in which the lane lines are not recognizable on the basis of the virtual line set by the virtual line setter.

7 Claims, 14 Drawing Sheets

(51) Int. Cl.
*B60R 21/00* (2006.01)
*B60T 8/17* (2006.01)
*B60W 30/10* (2006.01)
*G01S 13/931* (2020.01)
*G06K 9/00* (2006.01)

(52) U.S. Cl.
CPC ........ *G01S 13/931* (2013.01); *G06K 9/00798* (2013.01); *G08G 1/161* (2013.01); *G08G 1/164* (2013.01)

(56) References Cited

U.S. PATENT DOCUMENTS

| | | | |
|---|---|---|---|
| 2015/0070501 A1* | 3/2015 | Ooi | G08G 1/09626 348/148 |
| 2018/0024564 A1* | 1/2018 | Matsuda | B60W 30/09 701/25 |
| 2018/0154893 A1* | 6/2018 | Izuhara | G08G 1/0962 |

* cited by examiner

VEHICLE CONTROL SYSTEM, VEHICLE CONTROL METHOD, AND VEHICLE CONTROL PROGRAM

TECHNICAL FIELD

The present invention relates to a vehicle control system, a vehicle control method, and a storage medium.

BACKGROUND ART

In recent years, research on a technology for generating a target trajectory for a vehicle to arrive at a destination and performing automated driving of the vehicle along the generated target trajectory has advanced. In this regard, a technology for setting virtual lines when lane lines such as white lines cannot be detected and guiding a vehicle with a target trajectory along the virtual lines has been disclosed (see, for example, Patent Literature 1).

CITATION LIST

Patent Literature

[Patent Literature 1]
Japanese Unexamined Patent Application, First Publication No. 2013-232079

SUMMARY OF INVENTION

Technical Problem

However, in the technology of the related art, setting of virtual lines in the vicinity of a toll booth with a high probability of failure in virtual line detection is prohibited. Therefore, sometimes in the vicinity of a toll booth, it is not possible to generate a target trajectory and thus it is not possible to continue automated driving of the vehicle.

The present invention has been made in view of such circumstances and it is an object of the present invention to provide a vehicle control system, a vehicle control method, and a vehicle control program which can enhance the continuity of execution of automated driving in the vicinity of a toll booth.

Solution to Problem

According to an aspect, a vehicle control system includes a lane line recognizer configured to recognize lane lines of a road on which a vehicle is traveling, a virtual line setter configured to, when there is a section in which the lane lines are not recognizable by the lane line recognizer after passing through a gate installed on the road, set a virtual line with a terminating end portion of a lane line extending from the gate or an object present near the gate as one end and a beginning end portion of the lane line in a future travel area of the vehicle which is present ahead of the section in which the lane lines are not recognizable as another end, and an automated driving controller configured to perform automated driving in the section in which the lane lines are not recognizable on the basis of the virtual line set by the virtual line setter.

According to another aspect, the vehicle control system further includes an external environment recognizer configured to recognize positions of nearby vehicles in front of or to a side of the vehicle, and a vehicle line recognizer configured to recognize a vehicle line formed by nearby vehicles on the basis of the positions of the nearby vehicles recognized by the external environment recognizer, wherein the automated driving controller is configured to cause the vehicle to travel following the vehicle line recognized by the vehicle line recognizer.

According to another aspect, the vehicle line recognizer is configured to, when a plurality of vehicle lines are recognized, estimate a degree of stability of each of the plurality of vehicle lines and select a vehicle line on the basis of a result of the estimation, and the automated driving controller is configured to cause the vehicle to travel following the vehicle line selected by the vehicle line recognizer.

According to another aspect, the vehicle line recognizer is configured to estimate the degree of stability on the basis of at least one of the number of nearby vehicles in each of the plurality of vehicle lines or a degree of alignment of the vehicle line.

According to another aspect, the automated driving controller is configured to switch to execution of automated driving based on the virtual line set by the virtual line setter or to execution of automated driving to follow the vehicle line recognized by the vehicle line recognizer according to a surrounding situation of the vehicle.

According to another aspect, a vehicle control method includes a computer recognizing lane lines of a road on which a vehicle is traveling, setting, when there is a section in which the lane lines are not recognizable after passing through a gate installed on the road, a virtual line with a terminating end portion of a lane line extending from the gate or an object present near the gate as one end and a beginning end portion of the lane line in a future travel area of the vehicle which is present ahead of the section in which the lane lines are not recognizable as another end, and performing automated driving in the section in which the lane lines are not recognizable on the basis of the set virtual line.

According to another aspect, a non-transitory computer-readable storage medium that stores an in-vehicle control program to be executed by an in-vehicle computer to perform at least recognize lane lines of a road on which a vehicle is traveling, set, when there is a section in which the lane lines are not recognizable after passing through a gate installed on the road, a virtual line with a terminating end portion of a lane line extending from the gate or an object present near the gate as one end and a beginning end portion of the lane line in a future travel area of the vehicle which is present ahead of the section in which the lane lines are not recognizable as another end, and perform automated driving in the section in which the lane lines are not recognizable on the basis of the set virtual line.

Advantageous Effects of Invention

According to the aspects above, the vehicle can enhance the continuity of execution of autonomous driving in the vicinity of a toll booth.

According to the aspects above, the vehicle can travel smoothly with the flow of a line of nearby vehicles in sections in which lane lines cannot be recognized.

According to the aspects above, the vehicle can travel in a vehicle line in which the flow of nearby vehicles is more stable.

According to the aspects above, the vehicle can realize automated driving control suitable for the surrounding situation in sections in which lane lines cannot be recognized.

DESCRIPTION OF EMBODIMENTS

Hereinafter, embodiments of a vehicle control system, a vehicle control method, and a vehicle control program of the present invention will be described with reference to the drawings.

[Overall Configuration]

Figure 1:
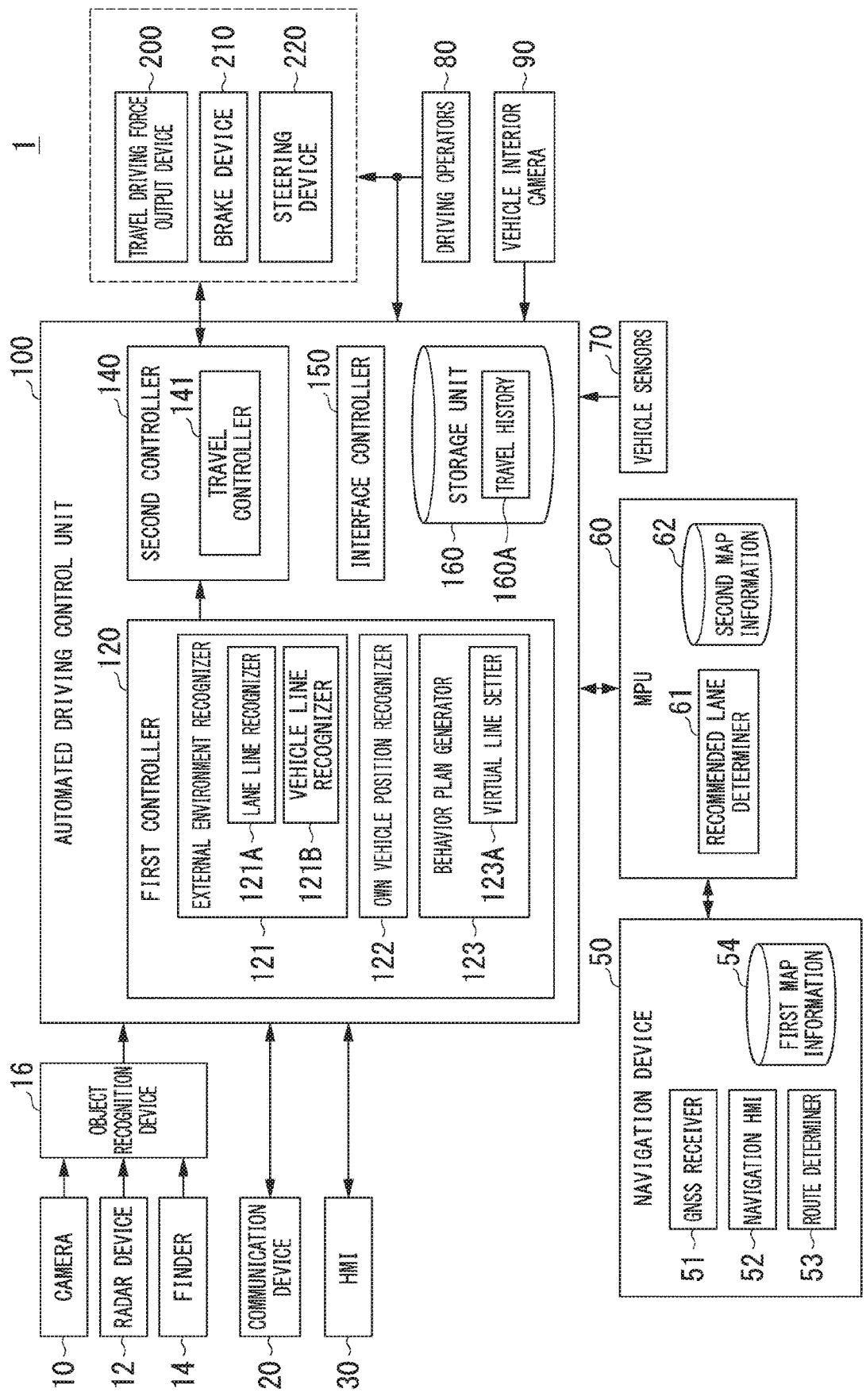
FIG. 1 is a block diagram of a vehicle system 1 including an automated driving control unit 100.

FIG. 1 is a configuration diagram of a vehicle system 1 including an automated driving control unit 100. A vehicle in which the vehicle system 1 (hereinafter referred to as an "own vehicle M") is mounted is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. The electric motor operates using electric power generated by a generator connected to the internal combustion engine or using discharge power of a secondary battery or a fuel cell.

The vehicle system 1 includes, for example, a camera 10, a radar device 12, a finder 14, an object recognition device 16, a communication device 20, a human machine interface (HMI) 30, a navigation device 50, a micro-processing unit (MPU) 60, vehicle sensors 70, driving operators 80, a vehicle interior camera 90, an automated driving control unit 100, a travel driving force output device 200, a brake device 210, and a steering device 220. These devices or apparatuses are connected to each other by a multiplex communication line or a serial communication line such as a controller area network (CAN) communication line, a wireless communication network, or the like. The components shown in FIG. 1 are merely an example and some of the components may be omitted or other components may be added.

The "vehicle control system" includes, for example, the camera 10, the radar device 12, the finder 14, the object recognition device 16, and the automated driving control unit 100.

The camera 10 is, for example, a digital camera using a solid-state imaging device such as a charge coupled device (CCD) or a complementary metal oxide semiconductor (CMOS). One or a plurality of cameras 10 are attached to the vehicle in which the vehicle system 1 is mounted at arbitrary locations. For imaging the area in front of the vehicle, a camera 10 is attached to an upper portion of a front windshield, a rear surface of a rearview mirror, or the like. For imaging the area behind the vehicle, a camera 10 is attached to an upper portion of a rear windshield, a back door, or the like. For imaging the area to the side of the vehicle, a camera 10 is attached to a door mirror or the like. For example, the camera 10 repeats imaging of the surroundings of the own vehicle M at regular intervals. The camera 10 may also be a stereo camera.

The radar device 12 radiates radio waves such as millimeter waves around the own vehicle M and detects radio waves reflected by an object (reflected waves) to detect at least the position (distance and orientation) of the object. One or a plurality of radar devices 12 may be attached to the own vehicle M at arbitrary locations. The radar device 12 may detect the position and speed of an object using a frequency modulated continuous wave (FMCW) method.

The finder 14 is a light detection and ranging or laser imaging detection and ranging (LIDAR) finder which measures scattered light from an object in response to illuminated light to detect the distance to the object. One or a plurality of finders 14 may be attached to the own vehicle M at arbitrary locations.

The object recognition device 16 performs a sensor fusion process on results of detection by some or all of the camera 10, the radar device 12, and the finder 14 to recognize the position, type, speed, or the like of the object. The object recognition device 16 outputs the recognition result to the automated driving control unit 100.

For example, the communication device 20 communicates with other vehicles near the own vehicle M using a cellular network, a Wi-Fi network, Bluetooth (registered trademark), dedicated short range communication (DSRC) or the like or communicates with various server devices via wireless base stations.

The HMI 30 presents various types of information to an occupant in the vehicle and receives an input operation from the occupant. Examples of the HMI 30 include various display devices, speakers, buzzers, touch panels, switches, and keys.

The navigation device 50 includes, for example, a global navigation satellite system (GNSS) receiver 51, a navigation HMI 52, and a route determiner 53 and holds first map information 54 in a storage device such as a hard disk drive (HDD) or a flash memory. The GNSS receiver specifies the position of the own vehicle M on the basis of signals received from GNSS satellites. The position of the own vehicle M may also be specified or supplemented by an inertial navigation system (INS) using the output of the vehicle sensors 70. The navigation HMI 52 includes a display device, a speaker, a touch panel, a switch, a key, or the like. The navigation HMI 52 may be partly or wholly shared with the HMI 30 described above. For example, the route determiner 53 determines a route from the position of the own vehicle M specified by the GNSS receiver 51 (or an arbitrary input position) to a destination input by the occupant using the navigation HMI 52 by referring to the first map information 54. The first map information 54 is, for example, information representing shapes of roads by links indicating roads and nodes connected by the links. The first map information 54 may include curvatures of roads, point of interest (POI) information, or the like. The route determined by the route determiner 53 is output to the MPU 60. The navigation device 50 may also perform route guidance using the navigation HMI 52 on the basis of the route determined by the route determiner 53. The navigation device 50 may be realized, for example, by a function of a terminal device such as a smartphone or a tablet possessed by the user. The navigation device 50 may also transmit the current position and the destination to a navigation server via the communication device 20 and acquire a route returned from the navigation server.

The MPU 60 functions, for example, as a recommended lane determiner 61 and holds the second map information 62 in a storage device such as an HDD or a flash memory. The recommended lane determiner 61 divides the route provided from the navigation device 50 into a plurality of blocks (for example, into blocks each 100 meters long in the direction in which the vehicle travels) and determines a recommended lane for each block by referring to the second map information 62. The recommended lane determiner 61 determines the number of the lane from the left in which to travel. When there is a branch point, a merge point, or the like on the route, the recommended lane determiner 61 determines a recommended lane such that the own vehicle M can travel on a reasonable travel route for proceeding to the branch destination.

The second map information 62 is map information with higher accuracy than the first map information 54. The second map information 62 includes, for example, information on lane lines that divide a road. Lane lines include, for example, lines formed by intermittent lane lines such as Botts' dots or cat eyes and lines formed by objects such as curbs, poles, or fences, in addition to straight lane lines such as white lines and yellow lines. The second map information 62 includes, for example, information of the centers of lanes or information of the boundaries of lanes. The second map information 62 may also include road information, traffic regulation information, position information of various gates such as toll booths, address information (addresses/postal codes), facility information, telephone number information, or the like. The road information includes information indicating the types of roads such as expressways, toll roads, national roads, or prefectural roads or information such as the number of lanes of each road, the areas of emergency parking zones, the widths of lanes, the gradients of roads, the positions of roads (three-dimensional coordinates including longitude, latitude and height), the curvatures of curves of lanes, the positions of merge or branch points of lanes, signs installed on roads, or the like. The second map information 62 may be updated as needed by accessing another device using the communication device 20.

The vehicle sensors 70 include, for example, a vehicle speed sensor that detects the speed of the own vehicle M, an acceleration sensor that detects the acceleration thereof, a yaw rate sensor that detects an angular speed thereof about the vertical axis, an orientation sensor that detects the orientation of the own vehicle M, or the like.

The driving operators 80 include, for example, an accelerator pedal, a brake pedal, a shift lever, a steering wheel, and other operators. Sensors for detecting the amounts of operation or the presence or absence of operation are attached to the driving operators 80 and detection results thereof are output to either or both of the automated driving control unit 100 or the travel driving force output, brake, and steering devices 200, 210, and 220.

The vehicle interior camera 90 captures an image of, for example, the upper body around the face of an occupant seated in a seat (for example, the driver's seat) of the own vehicle M. The captured image of the vehicle interior camera 90 is output to the automated driving control unit 100.

[Automated Driving Control Unit]

The automated driving control unit 100 includes, for example, a first controller 120, a second controller 140, an interface controller 150, and a storage unit 160. Each of the first controller 120, the second controller 140, and the interface controller 150 is realized by a processor such as a central processing unit (CPU) executing a program (software). Some or all of the functional units of the first controller 120, the second controller 140, and the interface controller 150 which will be described below may be realized by hardware such as a large scale integration (LSI), an application specific integrated circuit (ASIC), or a field-programmable gate array (FPGA) or may be realized by hardware and software in cooperation.

An example of the "automated driving control unit" includes some or all of the external environment recognizer 121, the own vehicle position recognizer 122, the behavior plan generator 123 in the first controller 120 and the travel controller 141 in the second controller 140 which will be described later. For example, the automated driving control unit automatically controls at least one of acceleration/deceleration or steering of the own vehicle M to perform automated driving of the own vehicle M.

The first controller 120 includes, for example, the external environment recognizer 121, the own vehicle position recognizer 122, and the behavior plan generator 123.

The external environment recognizer 121 recognizes states such as the position, speed and acceleration of a nearby vehicle on the basis of information that is input from the camera 10, the radar device 12, and the finder 14 via the object recognition device 16. The position of the nearby vehicle may be represented by a representative point such as a center of gravity or a corner of the nearby vehicle or may be represented by a region expressed by a contour of the nearby vehicle. The "states" of the nearby vehicle may include an acceleration or jerk of the nearby vehicle or a "behavior state" (for example, whether or not the nearby vehicle is changing or is going to change lanes).

The external environment recognizer 121 may also recognize the positions of guardrails or utility poles, parked vehicles, pedestrians, and other objects in addition to nearby vehicles.

The external environment recognizer 121 includes, for example, a lane line recognizer 121A and a vehicle line recognizer 121B. Details of the functions of the lane line recognizer 121A and the vehicle line recognizer 121B will be described later.

The own vehicle position recognizer 122 recognizes, for example, a (traveling) lane in which the own vehicle M is traveling and the relative position and attitude of the own vehicle M with respect to the traveling lane. The own vehicle position recognizer 122 recognizes the traveling lane, for example, by comparing a pattern of road lane lines (for example, an arrangement of solid and broken lines) obtained from the second map information 62 with a pattern of road lane lines near the own vehicle M recognized from an image captured by the camera 10. This recognition may be performed taking into consideration a position of the own vehicle M acquired from the navigation device 50 or a result of processing by the INS.

Figure 2:
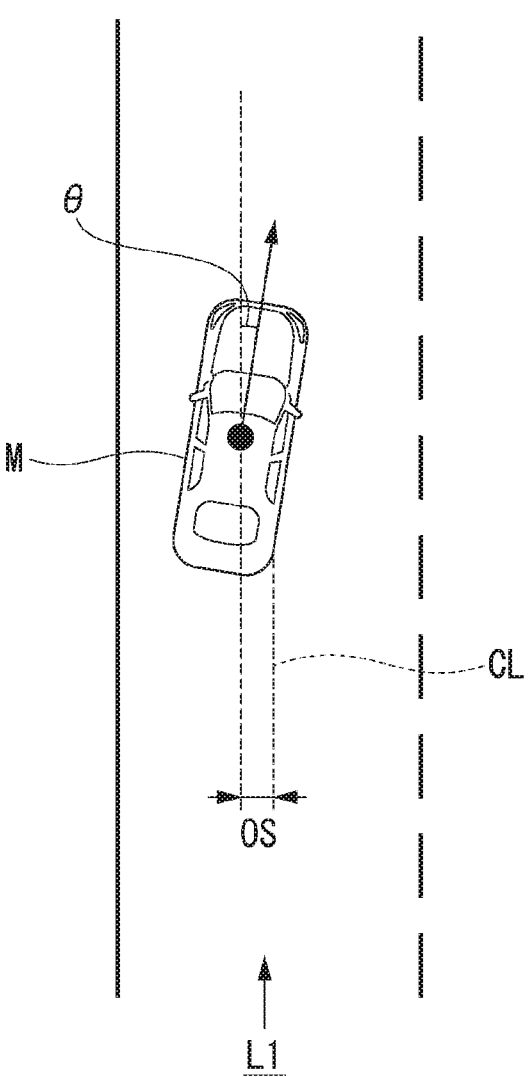
FIG. 2 is a diagram showing how the relative position and attitude of an own vehicle M with respect to a traveling lane L1 are recognized by an own vehicle position recognizer 122.

The own vehicle position recognizer 122 recognizes, for example, the position or attitude of the own vehicle M with respect to the traveling lane. FIG. 2 is a diagram showing how the relative position and attitude of the own vehicle M with respect to the traveling lane L1 are recognized by the own vehicle position recognizer 122. For example, the own vehicle position recognizer 122 recognizes both a deviation OS from a traveling lane center CL of a reference point (for example, the center of gravity) of the own vehicle M and an angle θ formed by the travel direction of the own vehicle M relative to an extension line of the traveling lane center CL as the relative position and attitude of the own vehicle M with respect to the traveling lane L1. Alternatively, the own vehicle position recognizer 122 may recognize the position of the reference point of the own vehicle M with respect to one of the sides of the traveling lane or the like as the relative position of the own vehicle M with respect to the traveling lane L1. The relative position of the own vehicle M recognized by the own vehicle position recognizer 122 is provided to the recommended lane determiner 61 and the behavior plan generator 123.

The behavior plan generator 123 generates a behavior plan for the own vehicle M to perform automated driving to the destination or the like. For example, the behavior plan generator 123 determines events which are to be sequentially performed in the automated driving such that the own vehicle M travels in the recommended lane determined by the recommended lane determiner 61 and copes with situations occurring near the own vehicle M. Examples of the events include a constant-speed travel event which is an event of traveling in the same lane at a constant speed, a following travel event which is an event of following a preceding vehicle, a lane change event, a merging event, a branching event, an emergency stop event, and a handover event which is an event of terminating automated driving and switching to manual driving. While these events are active or being executed, behaviors for avoidance may sometimes be planned on the basis of situations occurring near the own vehicle M (such as the presence of nearby vehicles and pedestrians or lane narrowing due to road construction).

The behavior plan generator 123 generates a target trajectory along which the own vehicle M will travel in the future. The target trajectory is expressed, for example, as an arrangement of points (trajectory points) which are to be reached by the own vehicle M in order. The trajectory points are points to be reached by the own vehicle M at intervals of a predetermined travel distance. Apart from this, a target speed and a target acceleration for each predetermined sampling time (for example, about every tenths of a second) are determined as a part of the target trajectory. The trajectory points may be respective positions at the predetermined sampling times which the own vehicle M is to reach at the corresponding sampling times. In this case, information on the target speed or the target acceleration is represented with the interval between the trajectory points.

Figure 3:
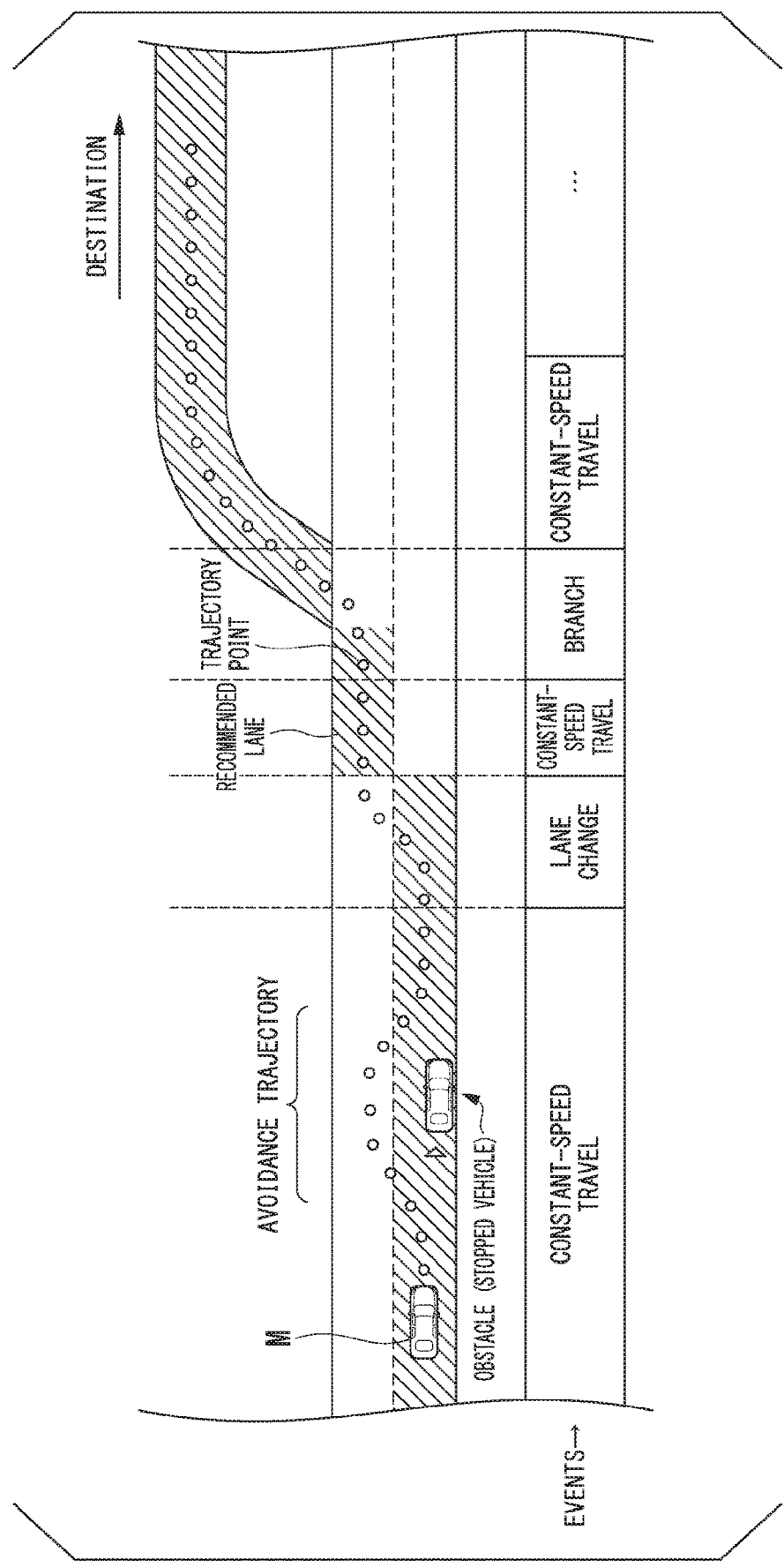
FIG. 3 is a diagram showing how a target trajectory is generated on the basis of a recommended lane.

FIG. 3 is a diagram showing how a target trajectory is generated on the basis of a recommended lane. As shown, the recommended lane is set to be convenient for traveling along the route to the destination. When the own vehicle M approaches a predetermined distance (which may be determined according to the types of events) before a position for switching to the recommended lane, the behavior plan generator 123 activates a lane change event, a branching event, a merging event, or the like. When it becomes necessary to avoid an obstacle during execution of each event, an avoidance trajectory is generated as shown in FIG. 3.

For example, the behavior plan generator 123 generates a plurality of candidate target trajectories and selects an optimal target trajectory that is suited to the route to the destination at a given point in time from the viewpoint of safety and efficiency.

The behavior plan generator 123 further includes, for example, a virtual line setter 123A. The virtual line setter 123A sets virtual lane lines (virtual lines) in a section in which lane lines cannot be recognized by the lane line recognizer 121A. The virtual lines are, for example, straight or curved lines. The virtual lines may be intermittent lines or may be lines formed by arranging patterns, symbols, characters, or the like. Details of the functions of the virtual line setter 123A will be described later.

The second controller 140 includes, for example, a travel controller 141. The travel controller 141 controls the travel driving force output device 200, the brake device 210, and the steering device 220 such that the own vehicle M passes along the target trajectory generated by the behavior plan generator 123 at scheduled times. The travel controller 141 may also perform control for switching between automated driving and manual driving of the own vehicle M on the basis of the occupant's operation received through the HMI 30.

The interface controller 150 generates information that is to be output through the HMI 30. The interface controller 150 also acquires information received through the HMI 30.

The storage unit 160 is a storage device such as a hard disk drive (HDD), a flash memory, a random access memory (RAM), or a read only memory (ROM). For example, a travel history 160A is stored in the storage unit 160. The travel history 160A is information in which travel information of the own vehicle M in sections in which lane lines cannot be recognized is associated with position information of the sections.

The travel driving force output device 200 outputs a travel driving force (torque) required for the vehicle to travel to driving wheels. The travel driving force output device 200 includes, for example, a combination of an internal combustion engine, an electric motor, a transmission, and the like and an electronic control unit (ECU) that controls them. The ECU controls the above constituent elements according to information input from the travel controller 141 or information input from the driving operators 80.

The brake device 210 includes, for example, a brake caliper, a cylinder that transmits hydraulic pressure to the brake caliper, an electric motor that generates hydraulic pressure in the cylinder, and a brake ECU. The brake ECU controls the electric motor according to information input from the travel controller 141 or information input from the driving operators 80 such that a brake torque corresponding to a braking operation is output to each wheel. The brake device 210 may include, as a backup, a mechanism for transferring a hydraulic pressure generated by an operation of the brake pedal included in the driving operators 80 to the cylinder via a master cylinder. The brake device 210 is not limited to that configured as described above and may be an electronically controlled hydraulic brake device that controls an actuator according to information input from the travel controller 141 and transmits the hydraulic pressure of the master cylinder to the cylinder. The brake device 210 may include brake devices of a plurality of systems in consideration of safety.

The steering device 220 includes, for example, a steering ECU and an electric motor. The electric motor, for example, applies a force to a rack-and-pinion mechanism to change the direction of the steering wheel. The steering ECU drives the electric motor according to information input from the travel controller 141 or information input from the driving operators 80 to change the direction of the steering wheel.

[Automated Driving Control of Own Vehicle M when Lane Lines Cannot be Recognized]

Hereinafter, automated driving control of the own vehicle M when lane lines on a road cannot be recognized will be described. For example, the own vehicle M of an embodiment sets virtual lines in a section in which it cannot recognize lane lines on a road on which it is traveling and performs automated driving on the basis of the set virtual lines. In addition, upon recognizing that there is a vehicle line near the own vehicle M in a section in which lane lines cannot be recognized, the own vehicle M of the embodiment may perform automated driving to travel following the vehicle line. The own vehicle M of the embodiment may also select one of these two modes, in which it is determined that the own vehicle M can travel stably, and execute automated driving accordingly. Automated driving control using virtual lines and automated driving control using a vehicle line for the own vehicle M will each be described below.

[Automated Driving Control using Virtual Lines]

Figure 4:
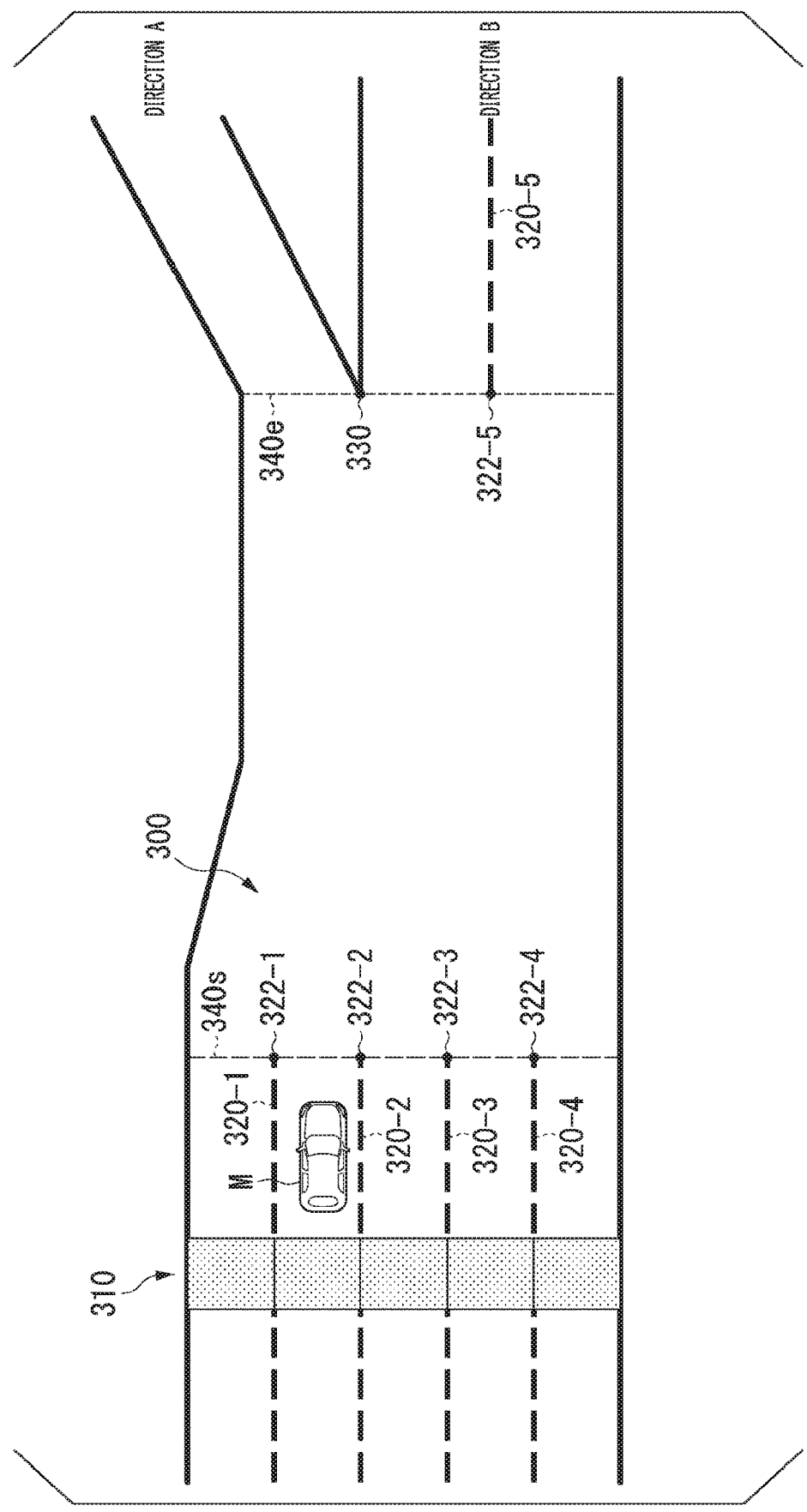
FIG. 4 is a diagram for explaining lane lines recognized by a lane line recognizer 121A and a section in which lane lines cannot be recognized.

FIG. 4 is a diagram for explaining lane lines recognized by the lane line recognizer 121A and a section in which lane lines cannot be recognized. The example of FIG. 4 shows a state after the own vehicle M passes through a gate 310 installed on a road 300 on which the own vehicle M is traveling. The gate 310 is, for example, that of a toll booth on an expressway or toll road. Lane lines corresponding to five gates on the entrance side are shown in the example of FIG. 4.

The lane line recognizer 121A recognizes lane lines near the own vehicle M, for example, from the shape of continuous portions of edge points in an image, for example, on the basis of information input from the camera 10, the radar device 12, and the finder 14 via the object recognition device 16. In the example of FIG. 4, the lane line recognizer 121A recognizes lane lines 320-1 to 320-5 near the own vehicle M. In the following description, the lane lines 320-1 to 320-5 will be referred to as "lane lines 320" when not distinguished.

Further, when the road which is being traveled on branches to different travel directions as direction A and direction B shown in FIG. 4, the lane line recognizer 121A may recognize the branch point 330 such that it is regarded as a beginning end portion of lane lines on the side in front. The lane line recognizer 121A may also acquire information on lane lines 320 or a branch point 330 for the current position of the own vehicle M from the second map information 62.

In addition, the lane line recognizer 121A recognizes a section in which lane lines cannot be recognized. In the example of FIG. 4, a section from a dotted line 340s to a dotted line 340e is that in which lane lines cannot be recognized by the lane line recognizer 121A. In this case, the lane line recognizer 121A recognizes position information of end points 322-1 to 322-5 of the lane lines 320 and position information of the branch point 330. Further, the lane line recognizer 121A may recognize position information of objects present near the gate 310 (for example, within a predetermined distance from the gate 310) as that of the end points 322 described above. Here, the objects are, for example, those such as curbs or poles serving as marks for dividing lanes present after passing through the gate 310. For example, when the lane lines 320-1 to 320-4 are not present on the gate 310 side, the lane line recognizer 121A may recognize objects present near the gate 310 and recognize the end points 322-1 to 322-4 on the basis of the objects. In the following description, it is assumed that the lane lines 320-1 to 320-4 are present on the gate 310 side.

The end points 322-1 to 322-4 are terminating end portions of the lane lines 320-1 to 320-4 extending from the gate 310. The end point 322-5 is a beginning end portion of the lane line 320-5 on the side which is farther from the gate 310 than the section in which lane lines cannot be recognized is. In other words, the end point 322-5 is the beginning end portion of the lane line 320-5 in a future travel area of the own vehicle M which is present ahead of the section in which lane lines cannot be recognized in the travel direction of the own vehicle M.

For example, the virtual line setter 123A sets a virtual line with one of the end points 322-1 to 322-4 as one end and one of the end point 322-5 and the branch point 330 as the other end after passing through the gate 310 installed on the road 300.

Example 1-1

Figure 5:
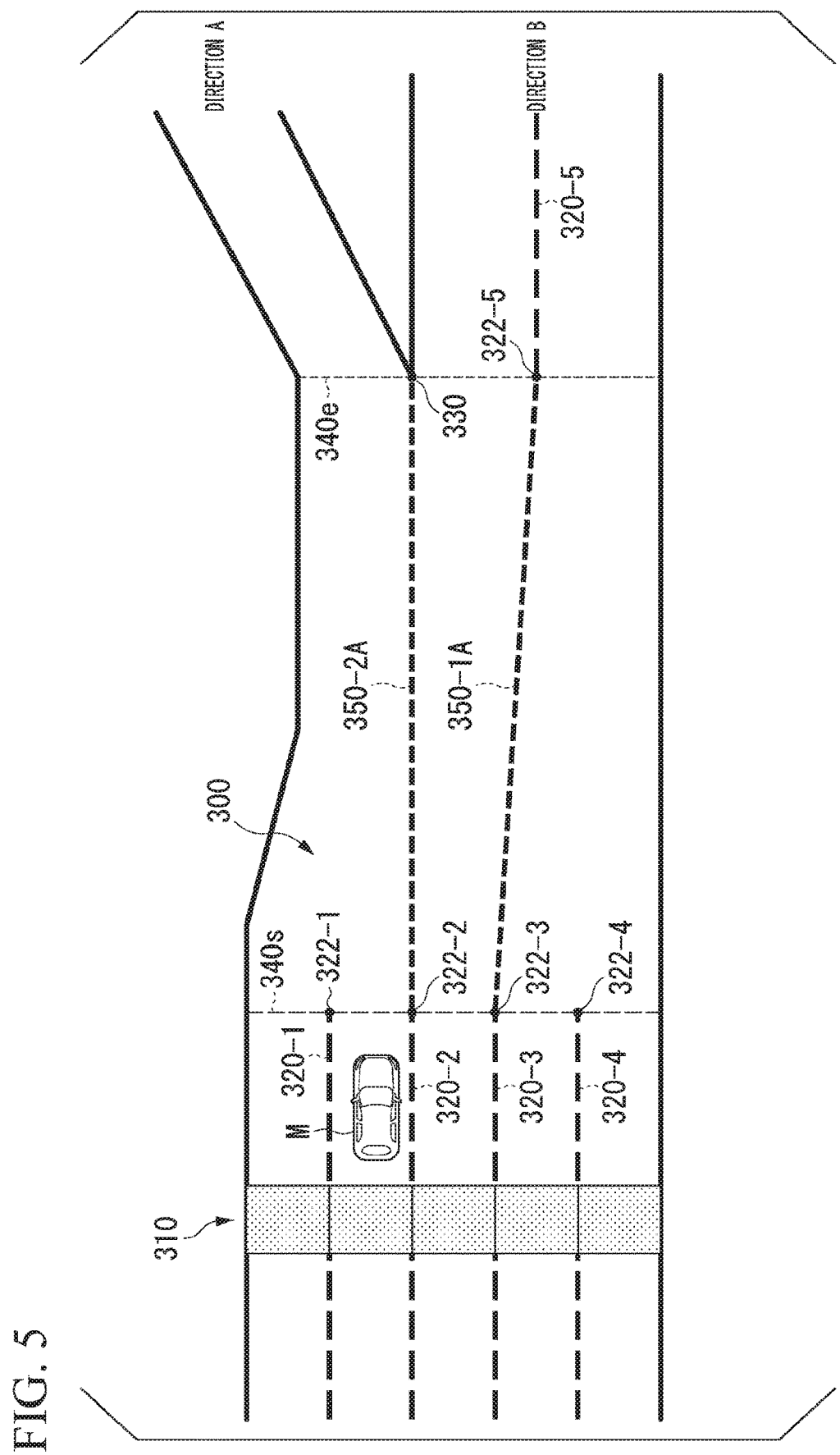
FIG. 5 is a diagram for explaining how to set virtual lines on the basis of recognized lane lines.

FIG. 5 is a diagram for explaining how to set virtual lines on the basis of recognized lane lines. In the example of FIG. 5, the virtual line setter 123A selects the end point 322-3 that is closest to the end point 322-5 among the end points 322-1 to 322-4 with reference to the position of the end point 322-5. Thereafter, the virtual line setter 123A sets a virtual line 350-1A that connects the end point 322-5 and the end point 322-3 as a straight line.

In addition, the virtual line setter 123A selects the end point 322-2 that is closest to the branch point 330 from the end points 322-1 to 322-4 excluding the end point 322-3 to which the virtual line is already connected and sets a virtual line 350-2A that connects the branch point 330 and the end point 322-2 as a straight line.

By performing the above processing, the behavior plan generator 123 generates a target trajectory for arriving at the destination, assuming the virtual lines 350-1A and 350-2A as lane lines. Then, the behavior plan generator 123 executes an event such as lane change on the basis of the virtual lines 350-1A and 350-2A according to the relationship between a lane to be traveled on and lanes divided by the virtual lines and performs lane change of the own vehicle M.

In the example of FIG. 5, when the own vehicle M is to travel in the direction B, the behavior plan generator 123 can cause the own vehicle M to travel in the direction B by executing an event for lane change to a lane on the right side of the virtual line 350-2A.

Example 1-2

Figure 6:
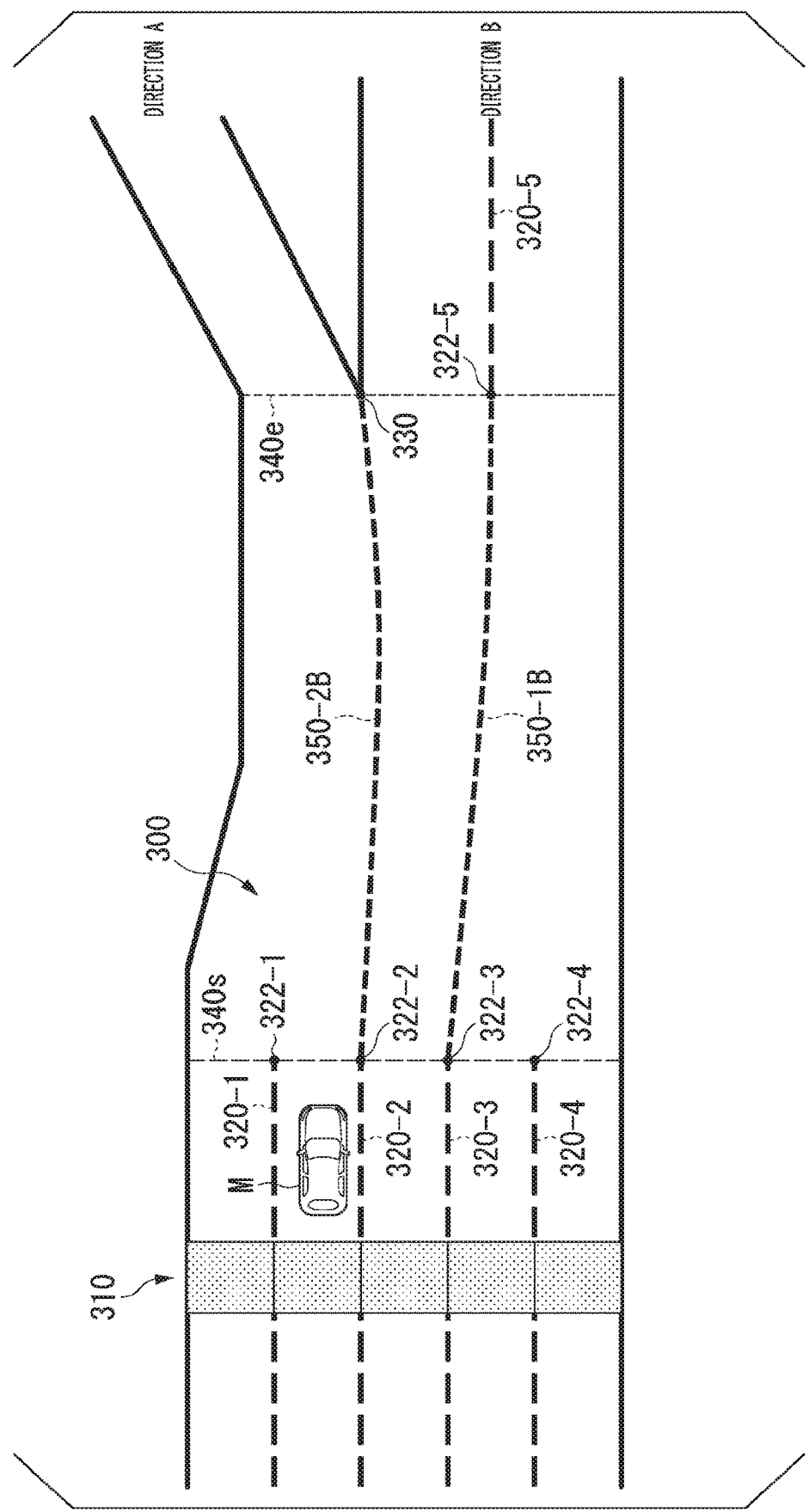
FIG. 6 is a diagram for explaining how to set curved virtual lines.

The virtual line setter 123A may also set virtual lines 350 represented by curves rather than straight lines. FIG. 6 is a diagram for explaining how to set curved virtual lines. The virtual line setter 123A sets, for example, a curve that is smoothly connected to the two lane lines 320-3 and 320-5 as a virtual line 350-1B. Similarly, the virtual line setter 123A sets a curve connecting the end point 322-2 and the branch point 330, which is smoothly connected to an outer edge of one of the lanes ahead of the branch point 330 and the lane line 320-2, as a virtual line 350-2B.

Thus, by using the virtual line 350-1B or 350-2B, the behavior plan generator 123 can generate a target trajectory for causing the own vehicle M to travel along a smooth trajectory. Accordingly, the own vehicle M can continue smooth traveling without giving a sense of discomfort to the occupants.

Example 2

Figure 7:
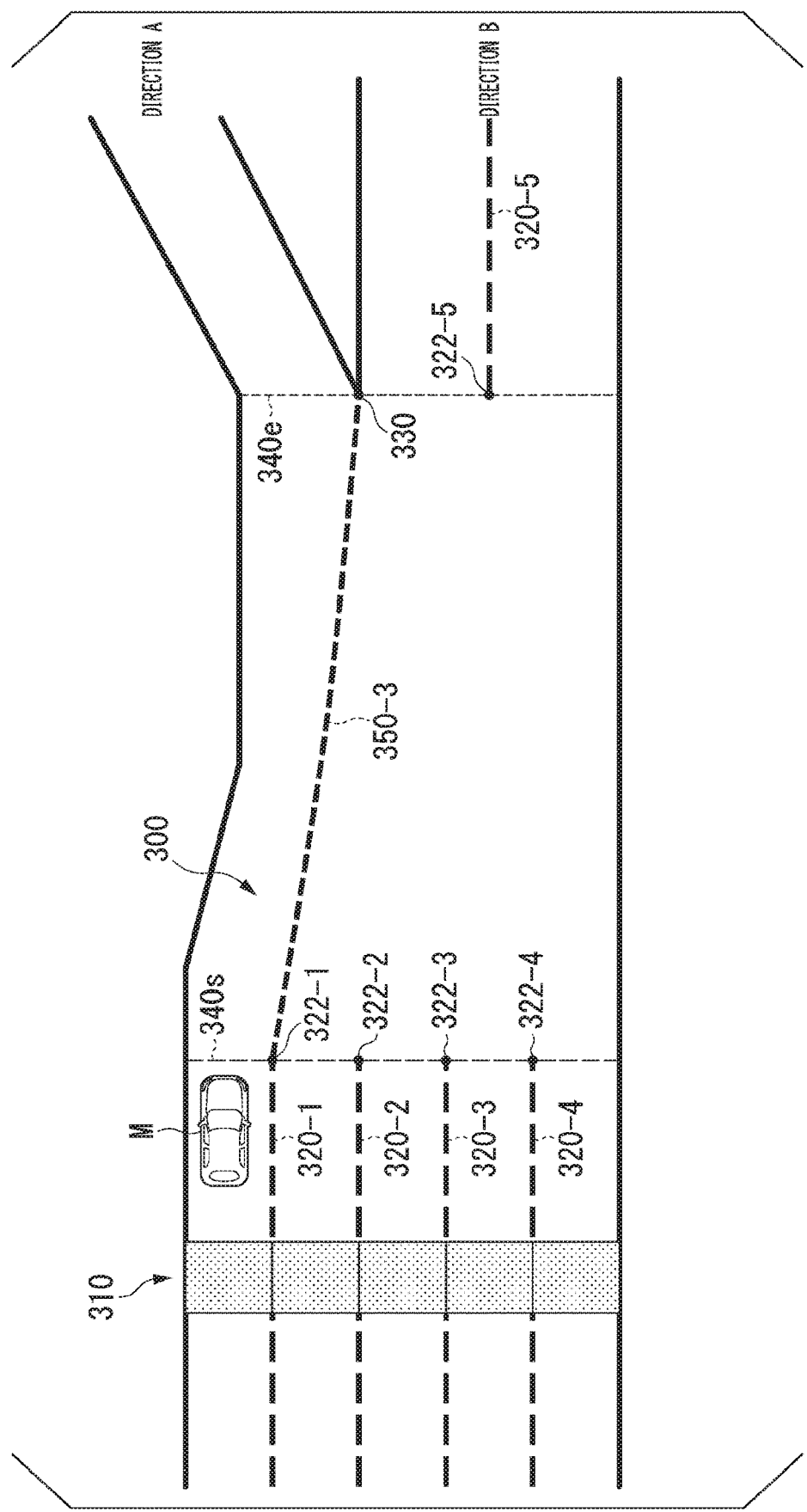
FIG. 7 is a diagram for explaining a state in which a virtual line is set on the basis of the position of the own vehicle M.

In the above example, virtual lines are set on the basis of the positions of the end points 322 of the lane lines 320 and the branch point 330. However, the virtual line setter 123A may also set a virtual line on the basis of the position of the own vehicle M. FIG. 7 is a diagram for explaining a state in which a virtual line is set on the basis of the position of the own vehicle M. In the examples of FIGS. 5 and 6, the virtual line setter 123A selects end points closest to the end point 322-5 and the branch point 330. However, in the example of FIG. 7, first, the virtual line setter 123A selects the end point 322-1 closest to the position of the own vehicle M from the end points 322-1 to 322-4. Then, the virtual line setter 123A selects the branch point 330 which is located closest to the selected end point 322-1 among the end point 322-5 and the branch point 330 and sets a virtual line 350-3 connecting the end point 322-1 and the branch point 330. Thereby, the own vehicle M can perform automated driving along a virtual lane which allows it to proceed smoothly from the current position.

Example 3

Figure 8:
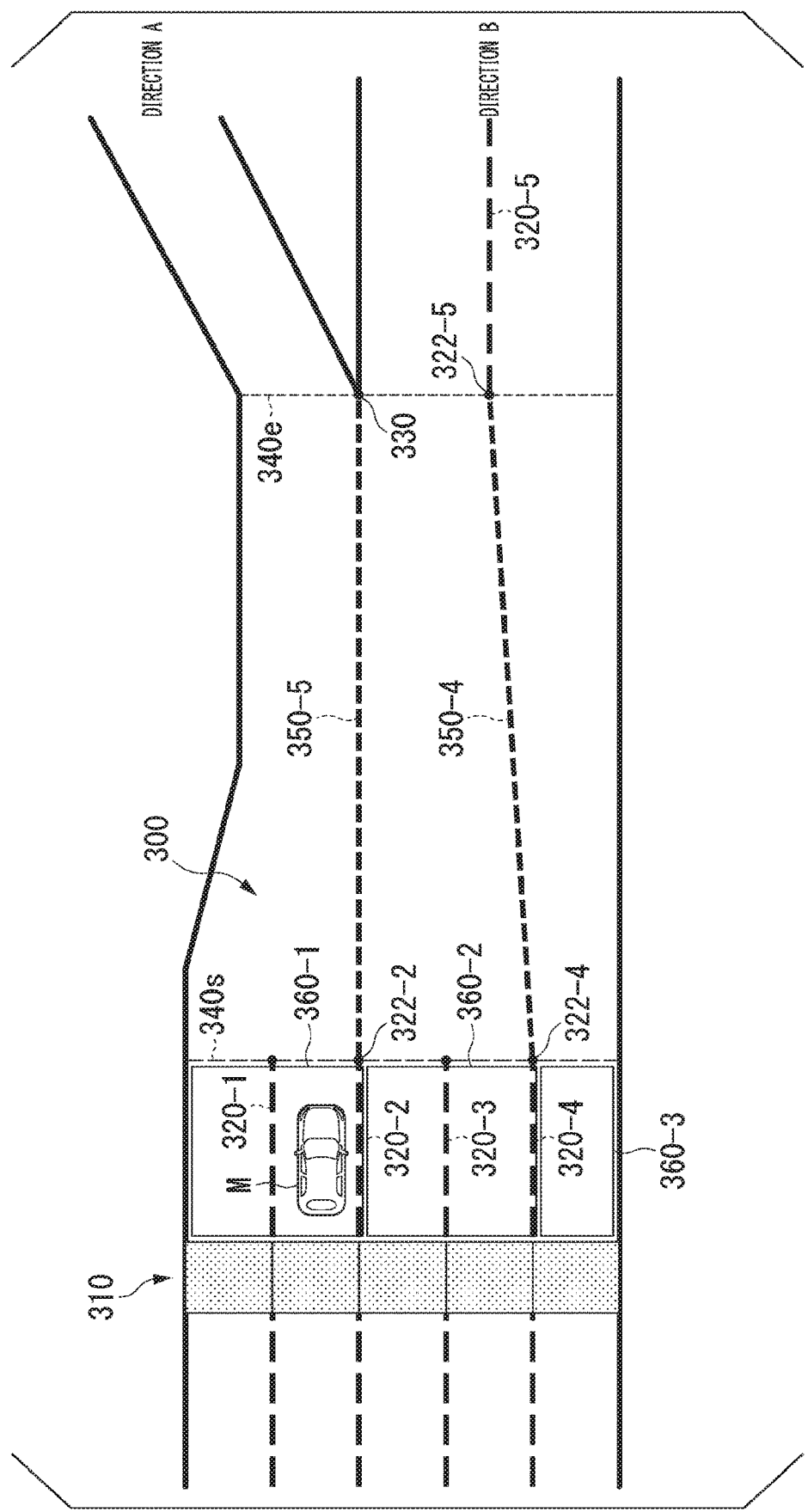
FIG. 8 is a diagram for explaining how to set virtual lines after grouping lanes.

In addition, when the number of lanes on the gate 310 side and the number of lanes ahead of the section in which lane lines 320 cannot be recognized are different, the virtual line setter 123A may set virtual lines after grouping adjacent lanes of the side with the greater number of lanes such that the number of resulting virtual lanes is made equal to that of the other side. FIG. 8 is a diagram for explaining how to set virtual lines after grouping lanes. In the example of FIG. 8, the number of lanes on the gate 310 side is five and the number of lanes ahead of the section in which lane lines 320 cannot be recognized is three.

In this case, for example, the virtual line setter 123A groups all lanes present after passing through the gate 310 into groups in order from one end of the lanes such that the upper limit of the number of lanes of each group is 1 plus (the integer value of) a number obtained by dividing the number of the lanes to be reduced by the number of lanes of the side with the smaller number of lanes.

In the example of FIG. 8, the virtual line setter 123A uses 2, which is obtained by adding 1 to the integer value of a number (1.666 . . . ) obtained by dividing the number of lanes 5 on the gate 310 side by the number of lanes 3 ahead of the section in which lane lines 320 cannot be recognized, as the number of lanes of each group. Then, the virtual line setter 123A groups all lanes present after passing through the gate 310 into groups in order from one end of the lanes such that the upper limit of the number of lanes of each group is two and thus sets three lane groups 360-1 to 360-3. In addition, the virtual line setter 123A sets virtual lines 350-4 and 350-5 on the basis of the positional relationships between the end points 322-2 and 322-4 of the lane lines 320-2 and 320-4 which divide the lane groups 360-1 to 360-3 and the end and branch points 322-5 and 330. By grouping lanes in this manner, the virtual line setter 123A can easily set end points for connection of virtual lines.

The virtual line setter 123A may also group a predetermined number of lanes in order from the farthest lane from the position of the own vehicle M. Further, the virtual line setter 123A may group lanes excluding the lane in which the own vehicle M is traveling and lanes adjacent to the traveling lane of the own vehicle M.

Example 4

Figure 9:
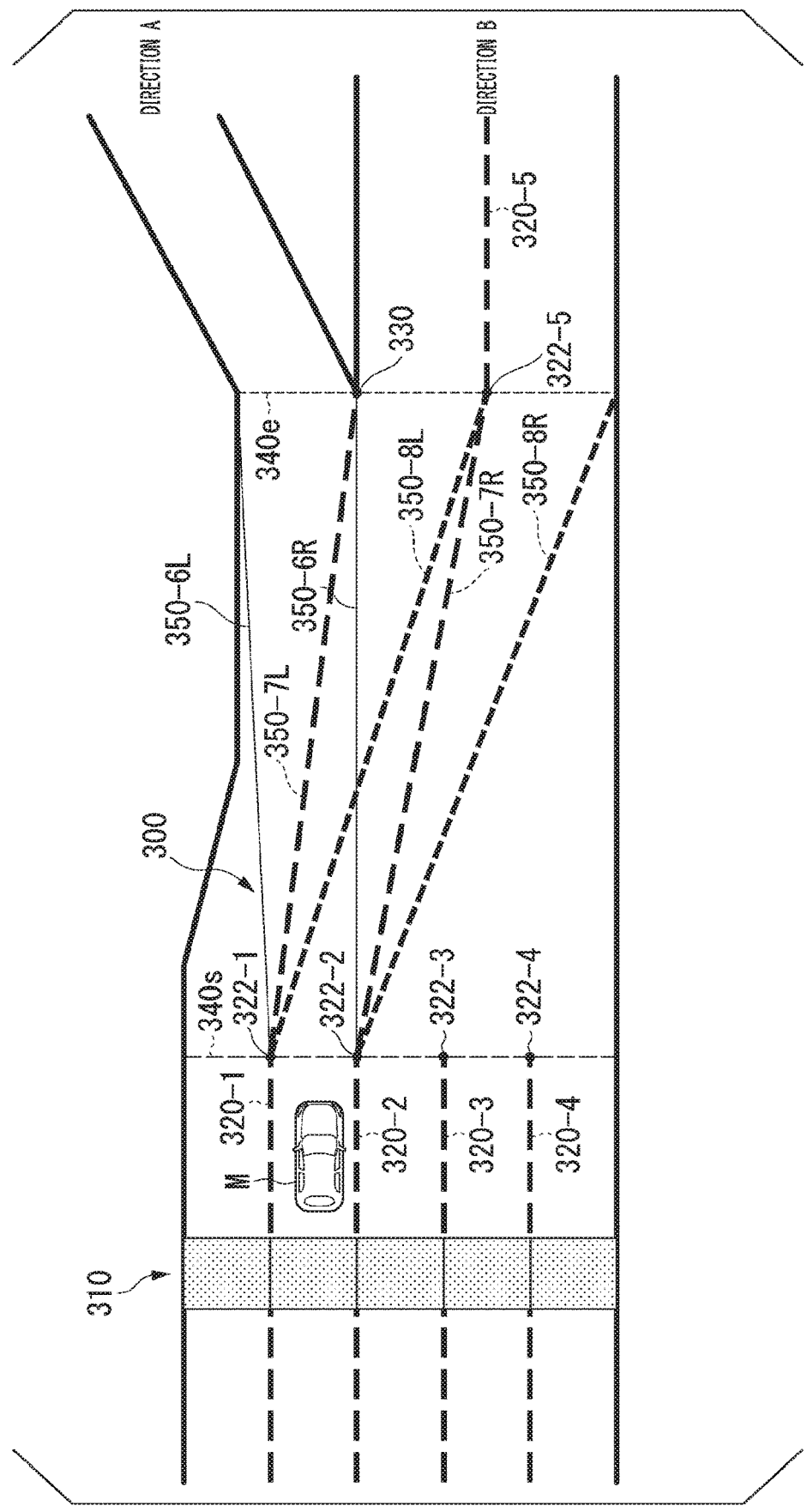
FIG. 9 is a diagram showing a state in which virtual lines corresponding to all lanes connected to a traveling lane of the own vehicle M are set.

The virtual line setter 123A may also set virtual lines corresponding to all lanes connected to the current traveling lane of the own vehicle M and select virtual lines corresponding to a lane to be traveled on in the future from the set virtual lines. FIG. 9 is a diagram showing a state in which virtual lines corresponding to all lanes connected to the traveling lane of the own vehicle M are set.

The virtual line setter 123A acquires the traveling lane of the own vehicle M on the basis of the current position of the own vehicle M and sets virtual lines corresponding to all lanes connected to the traveling lane of the own vehicle M on the basis of the positional relationships between the end points 322-1 and 322-2 of the lane lines 320-1 and 320-2 corresponding to the acquired traveling lane and the end and branch points 322-5 and 330.

In the example of FIG. 9, virtual lines 350-6L and 350-6R corresponding to a lane heading in the direction A from the traveling lane of the own vehicle M and virtual lines 350-7L and 350-7R and virtual lines 350-8L and 350-8R corresponding to lanes heading in the direction B are set. Here, the virtual line setter 123A sets the virtual lines 350-7L and 350-7R and the virtual lines 350-8L and 350-8R corresponding to the two lanes heading in the direction B. However, the virtual line setter 123A may set virtual lines 350-7L and 350-8R as those of one lane heading in the direction B. The virtual lines may be set in the shape of straight lines or curved lines.

The virtual line setter 123A selects virtual lines that define a lane corresponding to the direction toward the destination of the own vehicle M from the virtual lines 350-6L, 350-6R, 350-7L, 350-7R, 350-8L, and 350-8R shown in FIG. 9. Thus, the behavior plan generator 123 can cause the own vehicle M to travel through travel control of maintaining the lane in the travel direction. In addition, the virtual line setter 123A can set virtual lines corresponding to a plurality of lanes. Thus, for example, if there is an obstacle or the like when the own vehicle M is traveling on the basis of some virtual lines, the virtual line setter 123A can switch to other virtual lines to avoid the obstacle.

The virtual line setter 123A may also acquire past travel information for the section in which lane lines cannot be recognized from the travel history 160A and set virtual lines corresponding to the acquired past travel information.

[Automated Driving Control Using Vehicle Line]

Figure 10:
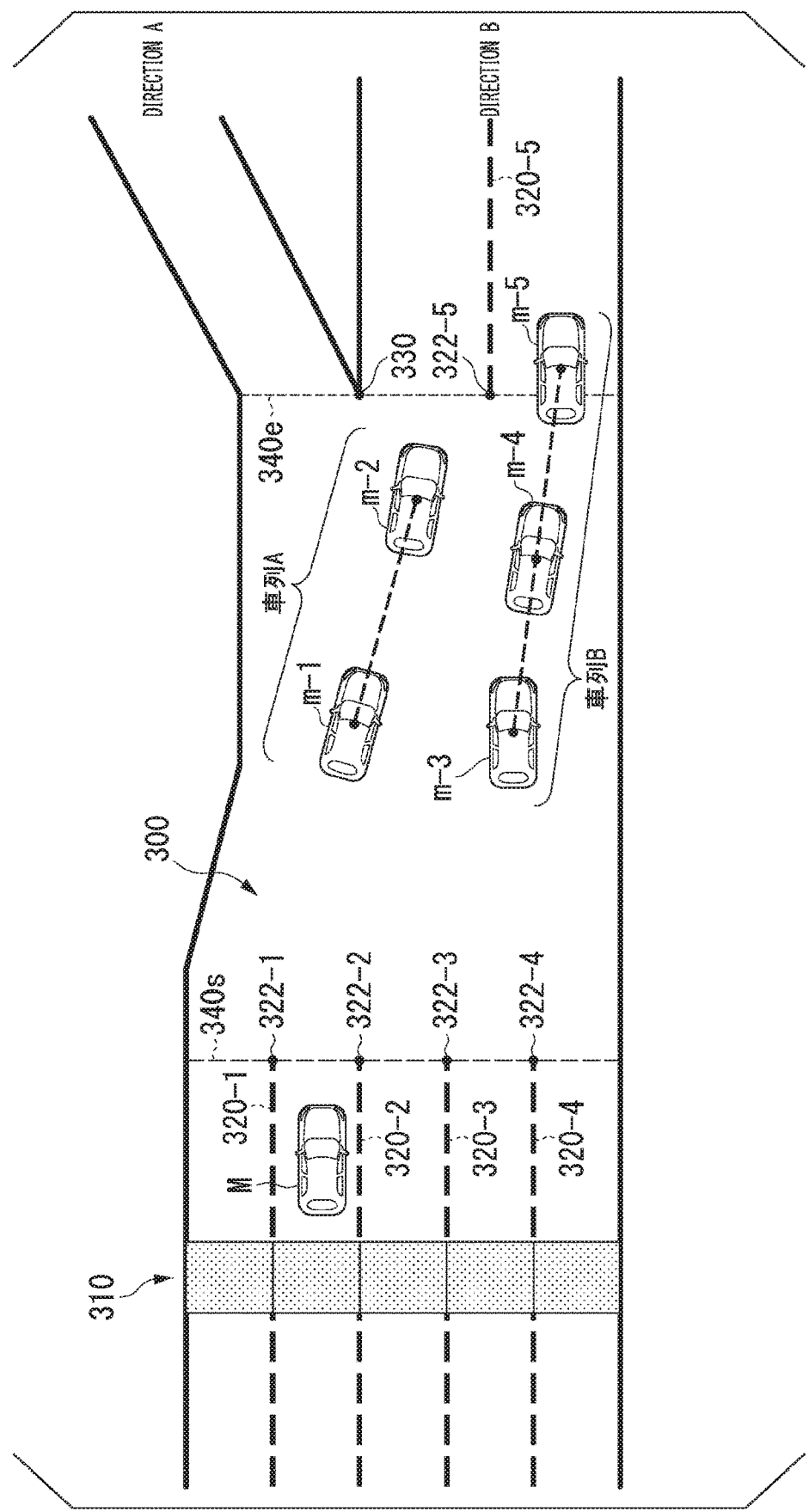
FIG. 10 is a diagram for explaining a state of automated driving using a vehicle line.

Next, automated driving control using a vehicle line according to an embodiment will be described. FIG. 10 is a diagram for explaining a state of automated driving using a vehicle line. The vehicle line recognizer 121B recognizes a vehicle line present in front of or to the side of the own vehicle M, for example, on the basis of the positions of nearby vehicles recognized by the external environment recognizer 121.

In the example of FIG. 10, the vehicle line recognizer 121B of the own vehicle M acquires position information of nearby vehicles m-1 to m-5 recognized by the external environment recognizer 121 in time series and recognizes the respective movement amounts and movement directions of the nearby vehicles m-1 to m-5 from the acquired position information. The vehicle line recognizer 121B recognizes a vehicle line on the basis of the position information, the movement amounts, and the movement directions.

In this case, the vehicle line recognizer 121B compares two nearby vehicles with each other and recognizes the two nearby vehicles as a vehicle line if the relative distance between the nearby vehicles is within a first threshold value, the difference between their movement amounts is within a second threshold value, and an angle formed by the movement direction of one of the nearby vehicles with respect to the movement direction of the other nearby vehicle is within a third threshold value. The first to third threshold values are preset.

By performing these processes for each pair of nearby vehicles, the vehicle line recognizer 121B recognizes vehicle lines A and B as shown in FIG. 10. The vehicle line A includes the nearby vehicles m-1 and m-2. The vehicle line B includes the nearby vehicles m-3 to m-5.

Here, it is assumed that the own vehicle M is to travel in the direction B. In this case, the vehicle line recognizer 121B selects a vehicle line, which is to be followed by the own vehicle M, from the recognized vehicle lines A and B. For example, the vehicle line recognizer 121B estimates the degree of stability of each of the vehicle lines A and B and selects one of the vehicle lines on the basis of the estimation result. For example, the vehicle line recognizer 121B estimates the number of vehicles which constitute each vehicle line as the degree of stability and selects a vehicle line with the greatest number of vehicles.

The vehicle line recognizer 121B may also estimate the degree of alignment of each of the vehicle lines A and B instead of (or in addition to) the number of vehicles thereof and select a vehicle line with the highest degree of alignment. In this case, for example, the vehicle line recognizer 121B sets straight lines approximated by the least squares method for the respective centers of gravity of the nearby vehicles included in the vehicle lines A and B, calculates averages of the squares of errors of the centers of gravity from the set straight lines, and selects a vehicle line with the smallest average as a vehicle line with the highest degree of alignment.

Alternatively, the vehicle line recognizer 121B may select a vehicle line which is closest to the own vehicle M among the recognized vehicle lines A and B. The vehicle line recognizer 121B may also select a vehicle line that is estimated to travel in the direction toward the destination of the own vehicle M from the travel direction of the vehicle line. Further, the vehicle line recognizer 121B may select the vehicle line A which is on the leftmost side (the lower speed side) among the recognized vehicle lines A and B.

The behavior plan generator 123 generates a target trajectory to travel behind the rearmost vehicle in the vehicle line selected by the vehicle line recognizer 121B and executes automated driving on the generated target trajectory.

When there is information on virtual lines set by the virtual line setter 123A and information on vehicle lines recognized by the vehicle line recognizer 121B, the behavior plan generator 123 may switch the information to be used for automated driving according to the surrounding situation of the own vehicle M. Thereby, the own vehicle M can realize automated driving control suitable for the surrounding situation.

In addition, when there is information on vehicle lines and information on virtual lines, the behavior plan generator 123 may generate a target trajectory by giving priority to the information on vehicle lines. In this case, the behavior plan generator 123 may give 100 percent priority to the information on vehicle lines, that is, ignore the information on virtual lines set by the virtual line setter 123A. The behavior plan generator 123 deletes the virtual lines 350 set by the virtual line setter 123A. This allows the own vehicle M to travel smoothly with the flow of a line of nearby vehicles.

The behavior plan generator 123 may also correct the virtual lines 350 set by the virtual line setter 123A on the basis of the position of a vehicle line to be followed. The position of the vehicle line is expressed, for example, by a line connecting the centers of gravity of vehicles included in the vehicle line.

Figure 11:
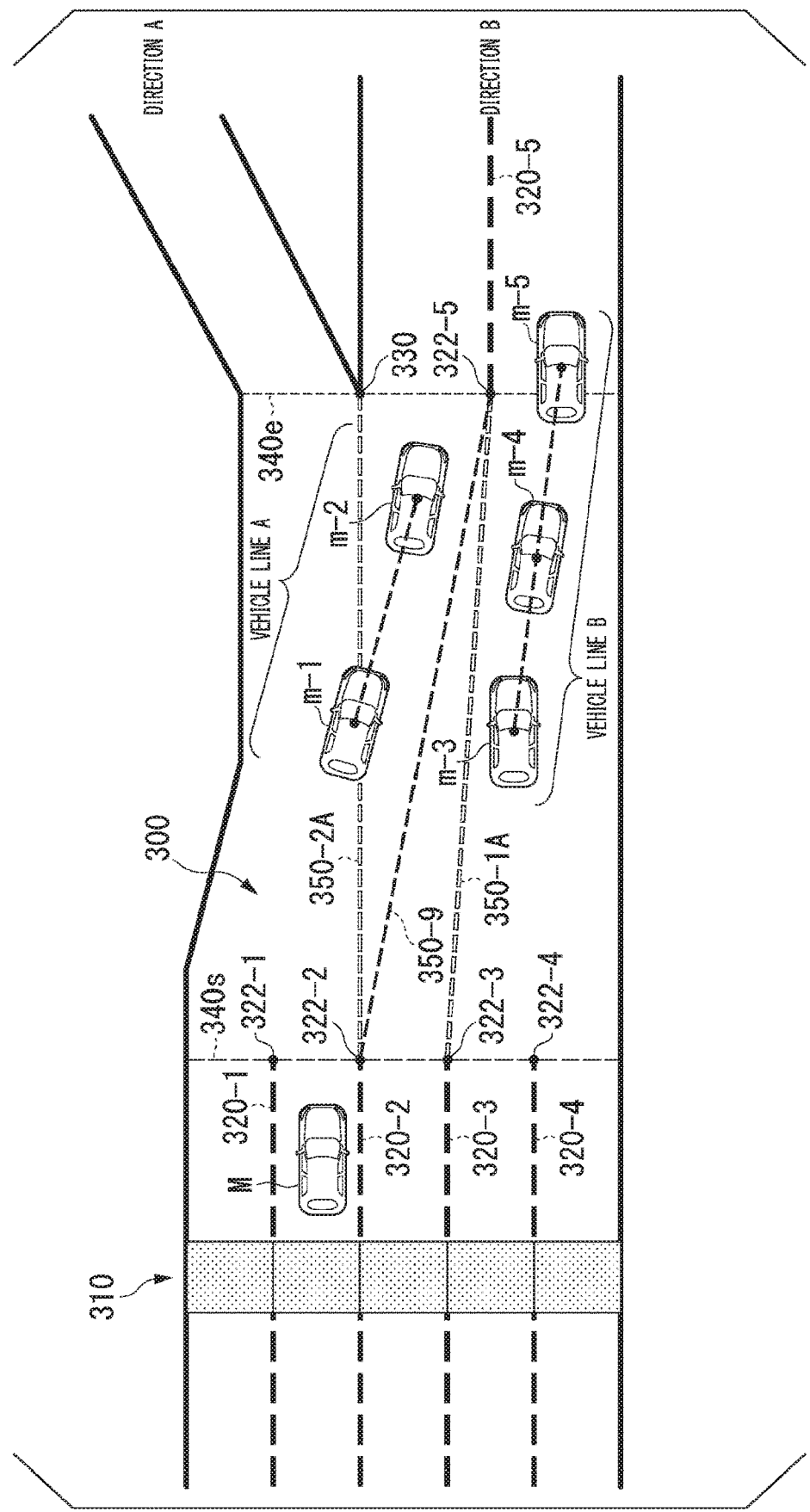
FIG. 11 is a diagram for explaining how to correct virtual lines.

FIG. 11 is a diagram for explaining how to correct virtual lines. In the example of FIG. 11, it is assumed that the virtual lines 350-1A and 350-2A shown in FIG. 5 described above have already been set by the virtual line setter 123A.

Based on the positions of vehicle lines A and B, the virtual line setter 123A sets a temporary virtual line at a position that is separated to the right or left by a predetermined distance from lines connecting the centers of gravity of vehicles included in the vehicle lines. Then, the virtual line setter 123A determines the degrees of correction for the virtual lines 350-1A and 350-2A with the set temporary virtual line and corrects one of the virtual lines for which the determined degree of correction is the lowest or is equal to or less than a threshold value. The degree of correction is, for example, a value based on the difference in the length and inclination of the virtual line before and after correction and the difference in the position of each end point of the virtual line before and after correction.

In the example of FIG. 11, when the own vehicle M follows the vehicle line B, the virtual line setter 123A sets a temporary virtual line 350-9 connecting the end point 322-5 closest to the position of the vehicle line B and an end point which is at a position closest to the position of the own vehicle M.

Further, the virtual line setter 123A determines the respective degrees of correction of the virtual lines 350-1A and 350-2A when they are corrected to the temporary virtual line 350-9 and determines that the virtual line 350-1A having the lowest degree of correction is a correction target. Then, the virtual line setter 123A corrects an end, on the gate 310 side, of the virtual line 350-1A from the end point 322-3 to the end point 322-2 to set the virtual line 350-9. As a result, without having to again recognize the positions of the end points 322, the branch point 330 or the like, the virtual line setter 123A can efficiently set the virtual line by effectively using the virtual line 350-1A that has been set once. The virtual line setter 123A deletes the virtual line 350-2A.

Figure 12:
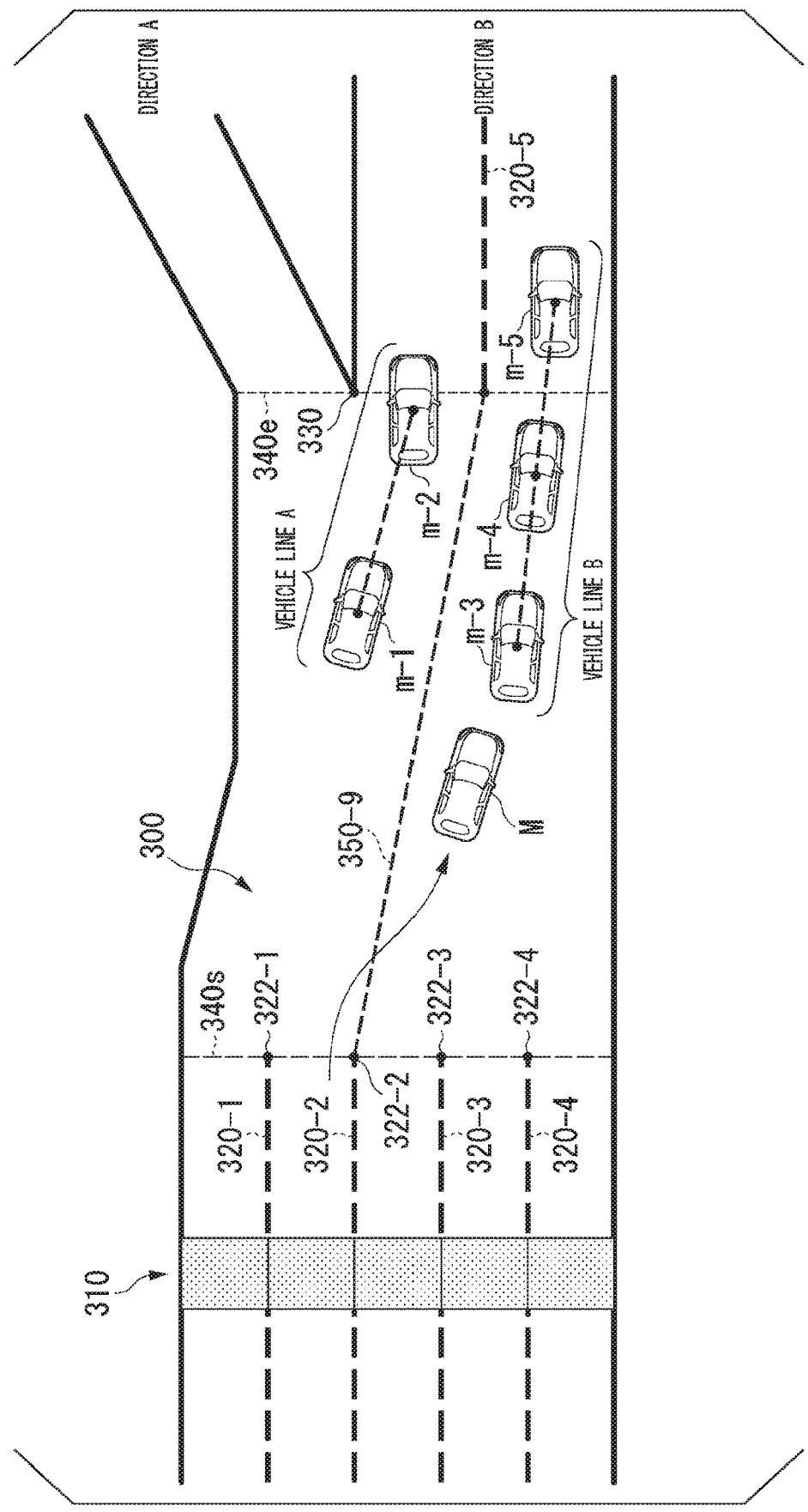
FIG. 12 is a diagram for explaining how the own vehicle M travels following a vehicle line B.

FIG. 12 is a diagram for explaining how the own vehicle M travels following the vehicle line B. In the example of FIG. 12, when the own vehicle M is to travel following the vehicle line B, the behavior plan generator 123 executes an event for lane change to a lane on the right side of the temporary virtual line 350-9 and further executes a following travel event with the rearmost vehicle in the vehicle line B (the nearby vehicle m-3) as a target vehicle. Thereby, the own vehicle M can realize smooth traveling in the section in which lane lines cannot be recognized.

The behavior plan generator 123 terminates the following travel when the own vehicle M is beyond the section in which lane lines cannot be recognized. However, even after the section, the behavior plan generator 123 may generate a behavior plan to continue the following travel if the vehicle line travels in the direction toward the destination of the own vehicle M.

In addition, even when no vehicle lines are recognized by the vehicle line recognizer 121B, the behavior plan generator 123 may perform, if nearby vehicles present in front of or to the side of the own vehicle M are recognized, travel following one of the nearby vehicles.

The own vehicle position recognizer 122 stores travel information of the own vehicle M in the section in which lane lines cannot be recognized in the storage unit 160 as a travel history 160A in which the travel information of the own vehicle M in the section is associated with position information of the section. This information is used later when the virtual line setter 123A sets virtual lines.

The interface controller 150 may cause the HMI 30 to output information on the virtual lines set by the virtual line setter 123A or information on the vehicle lines recognized by the vehicle line recognizer 121B. In this case, the interface controller 150 causes the display device of the HMI 30 to output the images as shown in FIGS. 5 to 12 described above. Thus, even in road conditions where there are no lane lines, the occupant can be aware that the own vehicle M is traveling on the basis of the virtual lines and the vehicle lines. This can improve the sense of security of the occupant with respect to automated driving.

[Process Flow]

Figure 13:
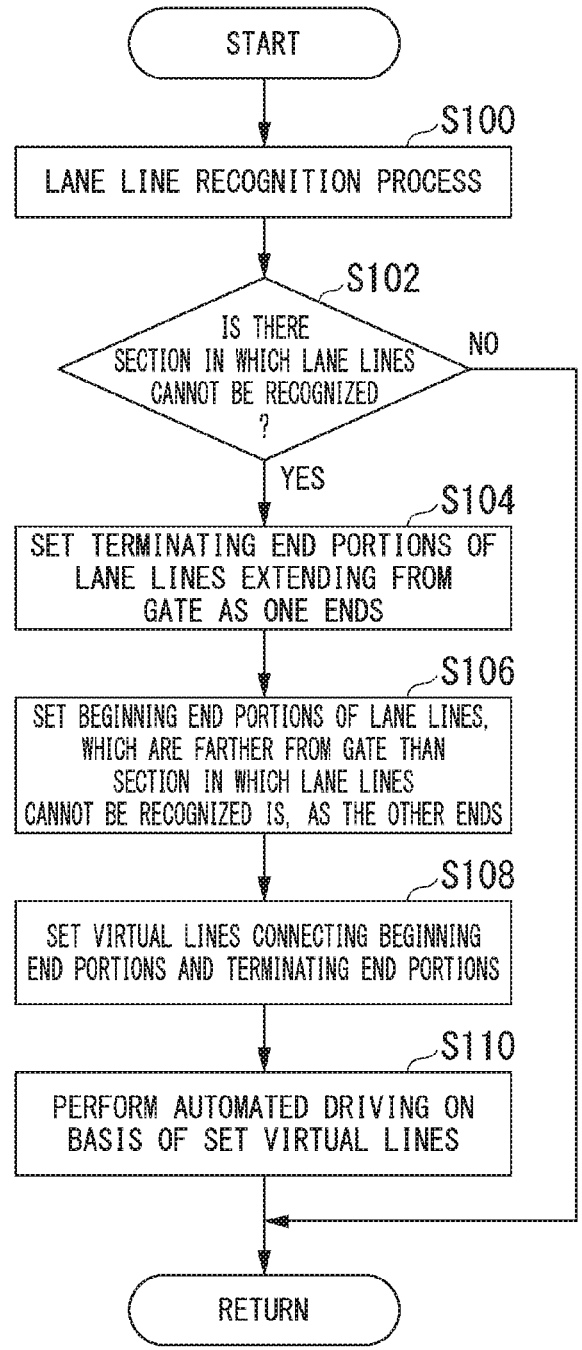
FIG. 13 is a flowchart showing an example of a vehicle control process using virtual lines according to an embodiment.

Hereinafter, examples of various vehicle controls of the vehicle system 1 according to an embodiment will be described. FIG. 13 is a flowchart showing an example of a vehicle control process using virtual lines according to the embodiment. In the example of FIG. 13, the process is repeatedly performed until the own vehicle M travels a predetermined distance (which may differ depending on the gate) from a position at which the own vehicle M has passed through the gate.

First, the lane line recognizer 121A performs a lane line recognition process (step S100) and determines whether or not there is a section in which lane lines cannot be recognized (step S102). When there is a section in which lane lines cannot be recognized, the virtual line setter 123A, for example, sets terminating end portions of lane lines extending from the gate as one ends (step S104), sets beginning end portions of lane lines, which are farther from the gate than the section in which lane lines cannot be recognized is, as the other ends (step S106), and sets virtual lines connecting the terminating end portions and the beginning end portions (step S108).

Next, the behavior plan generator 123 generates a target trajectory on the basis of the set virtual lines and performs automated driving on the basis of the generated target trajectory (step S110). The process of this flowchart ends after the process of step S110 or when it is determined in the process of step S102 that there is no section in which lane lines cannot be recognized.

Figure 14:
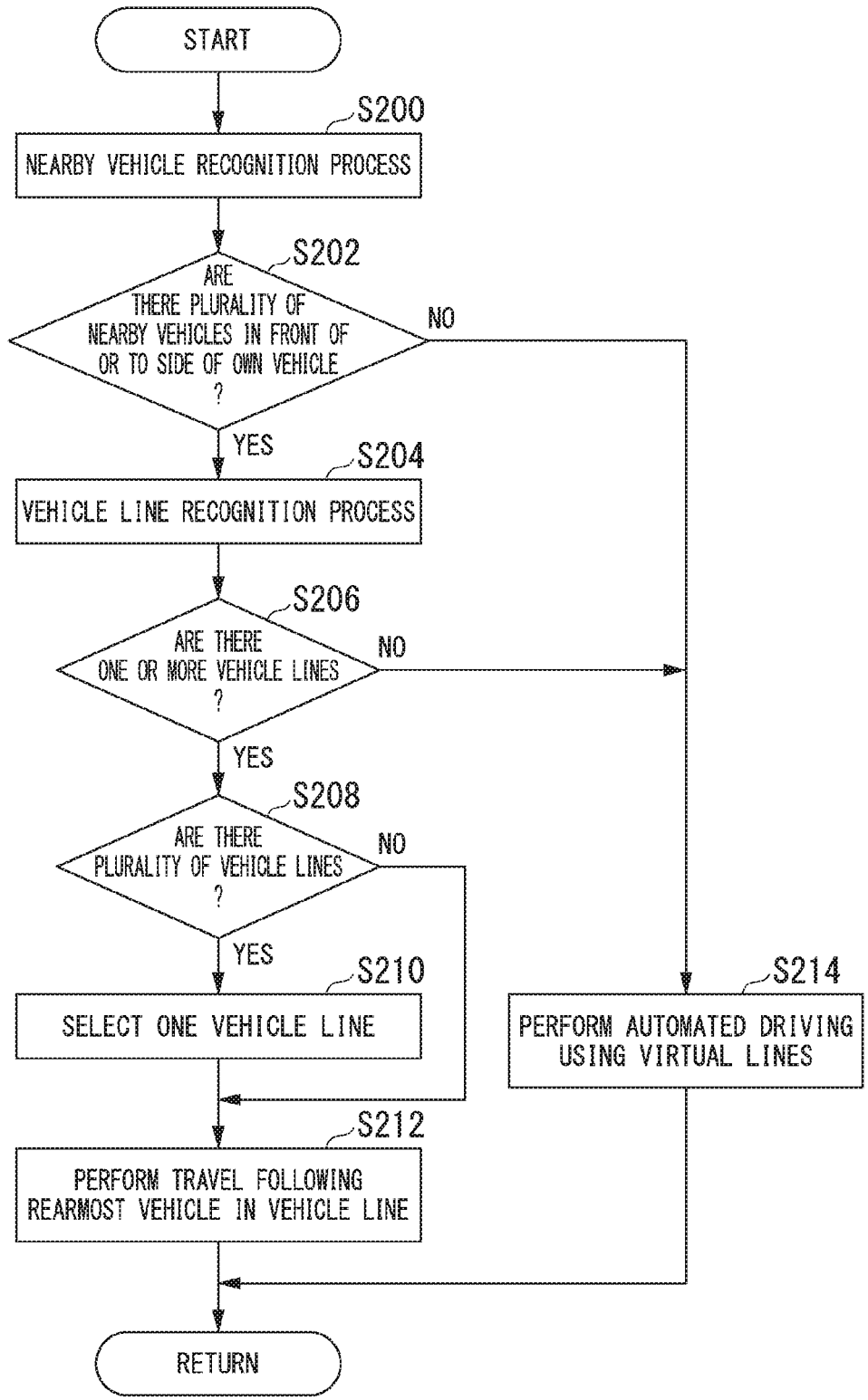
FIG. 14 is a flowchart showing an example of a vehicle control process using vehicle lines according to an embodiment.

FIG. 14 is a flowchart showing an example of a vehicle control process using vehicle lines according to an embodiment. In the example of FIG. 14, the process is repeatedly performed until the own vehicle M travels, by automated driving control, a predetermined distance (which may differ depending on the gate) from the position at which the own vehicle M has passed through the gate 310. Further, in the example of FIG. 14, it is assumed that the above process relating to virtual line setting has been performed.

First, the external environment recognizer 121 performs a process of recognizing vehicles near the own vehicle M (step S200) and determines whether or not there are a plurality of nearby vehicles in front of or to the side of the own vehicle M (step S202). When there are a plurality of nearby vehicles in front of or to the side of the own vehicle M, the vehicle line recognizer 121B performs a vehicle line recognition process (step S204) and determines whether or not there are one or more vehicle lines (step S206). When there are one or more vehicle lines, the vehicle line recognizer 121B determines whether or not there are a plurality of vehicle lines (step S208). When there are a plurality of vehicle lines, the vehicle line recognizer 121B selects one vehicle line, for example, on the basis of the number of vehicles included in the vehicle line or the degree of alignment of the vehicle line (step S210).

After the process of step S210 or when it is determined in the process of step S208 that there is one vehicle line, the behavior plan generator 123 performs travel following the rearmost vehicle in the vehicle line (step S212). When it is determined in the process of step S202 that there is no plurality of nearby vehicles in front of or to the side of the own vehicle or when it is determined in the process of step S206 that one or more vehicle lines are not present, the behavior plan generator 123 performs vehicle control using virtual lines (step S214). Then, the process of this flowchart ends.

In the embodiment, a part or all of the automated driving control using virtual lines described above or the automated driving control using vehicle lines described above may be combined with the other automated driving control.

According to the vehicle control system, the vehicle control method, and the vehicle control program according to the embodiment described above, it is possible to enhance the continuity of execution of automated driving in the vicinity of a toll booth. In the embodiment, the gate may be, for example, an entrance or exit gate of a parking lot as well as a gate of a toll booth and may also be a gate for purchasing or receiving a product in a service such as drive-through.

Further, according to the embodiment, by following a vehicle line formed by nearby vehicles, it is possible to perform smooth traveling along the flow of the line of nearby vehicles.

Although the modes for carrying out the present invention have been described above by way of embodiments, the present invention is not limited to these embodiments at all and various modifications and substitutions can be made without departing from the gist of the present invention.

REFERENCE SIGNS LIST

1 Vehicle system
10 Camera
12 Radar device
14 Finder
16 Object recognition device
20 Communication device
30 HMI
50 Navigation device
60 MPU
70 Vehicle sensor
80 Driving Operator
90 Vehicle interior camera
100 Automated driving control unit
120 First controller
121 External environment recognizer
121A Lane line recognizer
121B Vehicle line recognizer
122 Own vehicle position recognizer
123 Behavior plan generator
123A Virtual line setter
140 Second controller 141 Travel controller
150 Interface controller
160 Storage unit
200 Travel driving force output device
210 Brake device
220 Steering device
M Own vehicle

What is claimed is:

1. A vehicle control system comprising:
a lane line recognizer configured to recognize lane lines of a road on which a vehicle is traveling;
a virtual line setter configured to, when there is a section in which the lane lines are not recognizable by the lane line recognizer after passing through a gate installed on the road, set a virtual line with a terminating end portion of a lane line extending from the gate or an object present near the gate as one end and a beginning end portion of the lane line in a future travel area of the vehicle which is present ahead of the section in which the lane lines are not recognizable as another end; and
an automated driving controller configured to perform automated driving on the basis of the virtual line set by the virtual line setter.

2. The vehicle control system according to claim 1, further comprising:
an external environment recognizer configured to recognize positions of nearby vehicles in front of or to a side of the vehicle; and
a vehicle line recognizer configured to recognize a vehicle line formed by nearby vehicles on the basis of the positions of the nearby vehicles recognized by the external environment recognizer,
wherein the automated driving controller is configured to cause the vehicle to travel following the vehicle line recognized by the vehicle line recognizer.

3. The vehicle control system according to claim 2, wherein the vehicle line recognizer is configured to, when a plurality of vehicle lines are recognized, estimate a degree of stability of each of the plurality of vehicle lines and select a vehicle line on the basis of a result of the estimation, and
the automated driving controller is configured to cause the vehicle to travel following the vehicle line selected by the vehicle line recognizer.

4. The vehicle control system according to claim 3, wherein the vehicle line recognizer is configured to estimate the degree of stability on the basis of at least one of the number of nearby vehicles in each of the plurality of vehicle lines or a degree of alignment of the vehicle line.

5. The vehicle control system according to claim 2, wherein the automated driving controller is configured to switch to execution of automated driving based on the virtual line set by the virtual line setter or to execution of automated driving to follow the vehicle line recognized by the vehicle line recognizer according to a surrounding situation of the vehicle.

6. A vehicle control method comprising:
a computer recognizing lane lines of a road on which a vehicle is traveling;
setting, when there is a section in which the lane lines are not recognizable after passing through a gate installed on the road, a virtual line with a terminating end portion of a lane line extending from the gate or an object present near the gate as one end and a beginning end portion of the lane line in a future travel area of the vehicle which is present ahead of the section in which the lane lines are not recognizable as another end; and
performing automated driving in the section in which the lane lines are not recognizable on the basis of the set virtual line.

7. A non-transitory computer-readable storage medium that stores an in-vehicle control program to be executed by an in-vehicle computer to perform at least:
recognize lane lines of a road on which a vehicle is traveling;
set, when there is a section in which the lane lines are not recognizable after passing through a gate installed on the road, a virtual line with a terminating end portion of a lane line extending from the gate or an object present near the gate as one end and a beginning end portion of the lane line in a future travel area of the vehicle which is present ahead of the section in which the lane lines are not recognizable as another end; and
perform automated driving in the section in which the lane lines are not recognizable on the basis of the set virtual line.

* * * * *